(12) United States Patent
Zhang et al.

(10) Patent No.: US 10,340,792 B1
(45) Date of Patent: Jul. 2, 2019

(54) PMIC BOOT TIMING CIRCUIT AND PMIC BOOT TIMING DETERMINATION METHOD

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventors: Xianming Zhang, Guangdong (CN); Dan Cao, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/006,630

(22) Filed: Jun. 12, 2018

Related U.S. Application Data

(63) Continuation of application No. PCT/CN2018/074018, filed on Jan. 24, 2018.

(30) Foreign Application Priority Data

Dec. 28, 2017 (CN) .......................... 2017 1 1466548

(51) Int. Cl.
*H02M 3/07* (2006.01)

(52) U.S. Cl.
CPC ..................... *H02M 3/07* (2013.01)

(58) Field of Classification Search
CPC ........................................................ H02M 3/07
USPC .................................................. 327/530–543
See application file for complete search history.

(56) References Cited

U.S. PATENT DOCUMENTS

| | | | |
|---|---|---|---|
| 2011/0215374 A1* | 9/2011 | Lin ........................ | H01L 29/739 257/139 |
| 2017/0279346 A1* | 9/2017 | Cao ......................... | H02M 1/08 |
| 2018/0083530 A1* | 3/2018 | Ueno ..................... | H02M 1/088 |

* cited by examiner

*Primary Examiner* — Tomi Skibinski
(74) *Attorney, Agent, or Firm* — Hauptman Ham, LLP

(57) ABSTRACT

The present disclosure provides a PMIC boot timing circuit and a PMIC boot timing determination method. The circuit includes a PMIC, a first capacitor, a second capacitor, and a triode, wherein the PMIC includes a first buck module, a second buck module, a third buck module and a direct current source; one end of the first capacitor is connected to the direct current source, and the other end of the first capacitor is grounded; one end of the second capacitor is connected to one end of the direct current source, and the other end of the second capacitor is connected to the drain of the triode; the source of the triode is grounded, and the gate of the triode is connected to the PMIC. Compared with the related art, the circuit and the method provided by the present disclosure can achieve different timing generation and normal boot timing.

13 Claims, 2 Drawing Sheets

PMIC BOOT TIMING CIRCUIT AND PMIC BOOT TIMING DETERMINATION METHOD

RELATED APPLICATIONS

This application is a continuation application of PCT Patent Application No. PCT/CN2018/074018, filed Jan. 24, 2018, which claims the priority benefit of Chinese Patent Application No. 201711466548.5, filed Dec. 28, 2017, which is herein incorporated by reference in its entirety.

FIELD OF THE DISCLOSURE

The present disclosure relates to the field of PMIC booting technology, and in particular to a PMIC boot timing circuit and a PMIC boot timing determination method.

BACKGROUND

Currently power management integrated circuits (PMIC) become more and more streamlined, the used PMIC has omitted the internal non-volatile storage device. In this case, there is no internal code in the PMIC. At startup, three voltages required by the timing control circuit (TCON) will be set up first, the timing control circuit then reads the internal code required for the PMIC from the non-volatile memory device (NVM) and writes it to the PMIC via data transfer. The PMIC then outputs the voltage required for subsequent panel drivers to control the entire drive panel.

But for different timing control circuits, the required voltage and timing required are different, so this control method is very difficult to achieve.

Therefore, it is necessary to provide a new PMIC boot timing circuit and a PMIC boot timing determination method to overcome the above shortcomings.

SUMMARY

An object of the present disclosure is to provide a novel PMIC boot timing circuit and a PMIC boot timing determination method, which can achieve different timing generation and normal boot timing.

In order to achieve the above object, the present disclosure provides a PMIC boot timing circuit including a PMIC, a first capacitor, a second capacitor, and a triode, wherein the PMIC includes a first buck module, a second buck module, a third buck module and a direct current source; one end of the first capacitor is connected to the direct current source, and the other end of the first capacitor is grounded; one end of the second capacitor is connected to one end of the direct current source, and the other end of the second capacitor is connected to the drain of the triode; the source of the triode is grounded, and the gate of the triode is connected to the PMIC.

As one of the embodiments, the triode is for controlling the first capacitor and the second capacitor to be connected in parallel.

As one of the embodiments, the first buck module generates a first voltage; the direct current source charges the first capacitor to a first voltage threshold, and the second buck module generates a second voltage; the second voltage controls the triode to be turned on, the direct current source charges the first capacitor and the second capacitor to a second voltage threshold, and the third buck module generates a third voltage.

As one of the embodiments, the triode is a field effect triode.

The present disclosure further provides a PMIC boot timing determination method based on the PMIC boot timing circuit according to claim 1, which includes the following steps:

step 1, setting a buck module, wherein the first buck module, the second buck module and the third buck module inside the PMIC adopt a same setting;

step 2, generating a first voltage, wherein the first buck module generates the first voltage, and the direct current source charges the first capacitor, when the power is turned on;

step 3, generating a second voltage, wherein the second buck module generates the second voltage, and the second voltage controls the triode to be turned on to dispose the first capacitor and the second capacitor in parallel, when the direct current source charges the first capacitor to a first voltage threshold;

step 4, generating a third voltage, wherein the direct current source charges the first capacitor and the second capacitor to a second voltage threshold, and the third buck module generates the third voltage.

As one of the embodiments, the triode is a field effect triode.

Compared with the related art, in the PMIC boot timing circuit and the PMIC boot timing determination method provided in the present disclosure, the first buck module, the second buck module and the third buck module for generating three voltages in the PMIC adopt the same setting. Different voltages and generated times are generated by turning on the triode to control the first capacitor and the second capacitor in parallel state. The different voltages and the generated times are also generated by adjusting the voltage threshold reached by the direct current source charging the first capacitor and/or the second capacitor. In this way, the generation of different timing required by the timing control circuit and the normal boot sequence are realized, ensuring that the generation of each voltage and the timing can meet the requirements of the timing control circuit, enabling the entire panel to operate normally, and without the non-volatile memory device module in the PMIC.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, for those skilled in the art, other drawings can also be obtained based on these drawings without creative efforts.

DETAILED DESCRIPTION OF PREFERRED EMBODIMENTS

The technical solutions in the embodiments of the present disclosure will be described clearly and completely below. Obviously, the described embodiments are only a part but not all embodiments of the present disclosure. All other embodiments obtained by persons of ordinary skill in the art based on the embodiments of the present disclosure without creative efforts shall fall within the protection scope of the present disclosure.

Figure 1:
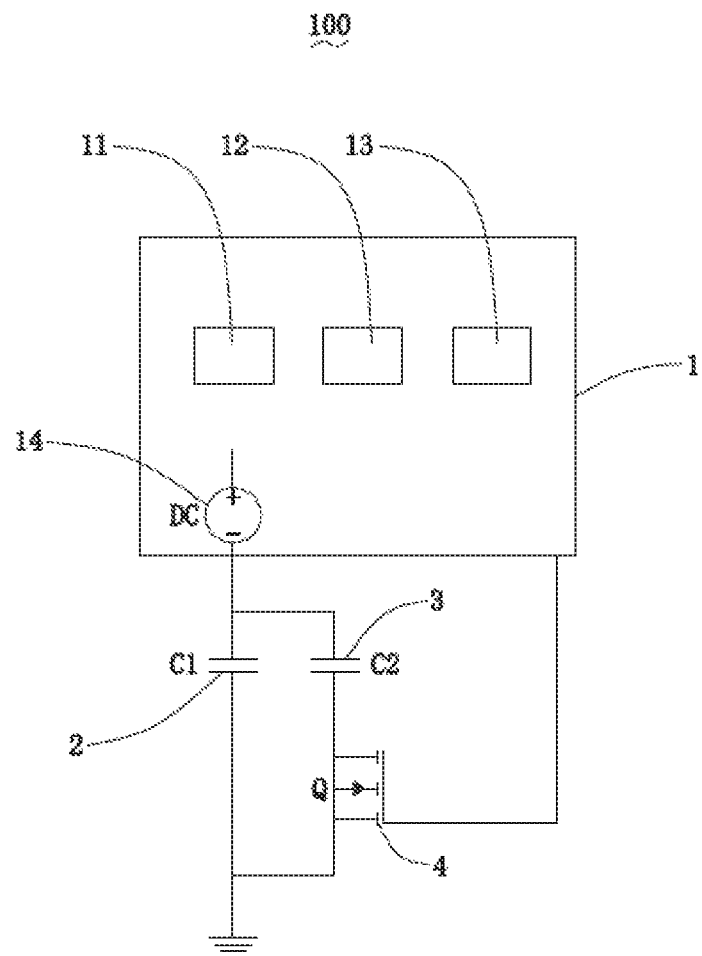
FIG. 1 is a circuit diagram of the PMIC boot timing circuit of the present disclosure.

Referring to FIG. 1, FIG. 1 is a circuit diagram of the PMIC boot timing circuit of the present disclosure. The present disclosure provides a PMIC boot timing circuit 100. The PMIC boot timing circuit 100 includes a PMIC 1, a first capacitor 2, a second capacitor 3, and a triode 4.

The PMIC 1 includes a first buck module 11, a second buck module 12, a third buck module 13, and a direct current source 14. The first buck module 11, the second buck module 12 and the third buck module 13 are used for generating three voltages required for driving the timing control circuit. Then, the internal code required by the PMIC 1 is read by the timing control circuit and input to the PMIC 1 through the data transmission mode so that the PMIC 1 can generate various voltages required for driving the subsequent panels.

The direct current source 14 is disposed in the PMIC 1 for charging the first capacitor 2 and the second capacitor 3. One end of the first capacitor 2 is connected to the direct current source 14 and the other end is grounded. One end of the second capacitor 3 is connected to one end of the direct current source 14, the other end of the second capacitor 3 is connected to the drain of the triode. The source of the triode 4 is grounded, and the gate of the triode 4 is connected to the PMIC 1. The triode 4 is an NMOS triode, the gate of the triode 4 is connected to the PMIC 1, and the triode 4 is controlled to be turned on. So that the first capacitor 2 and the second capacitor 3 increase the capacitance in parallel.

Figure 2:
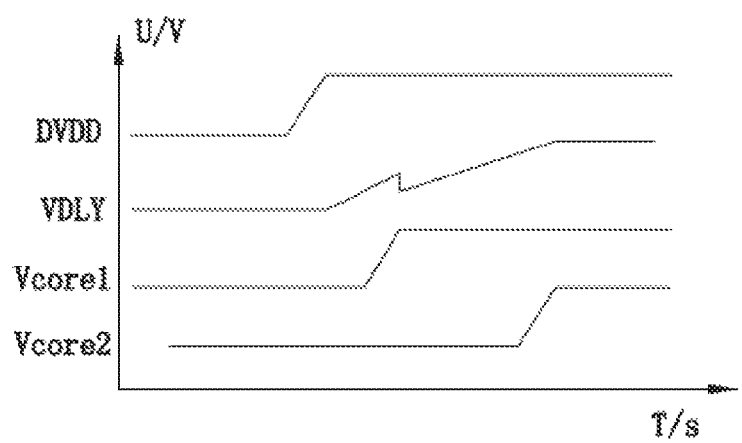
FIG. 2 is a timing diagram of the PMIC boot timing circuit of the present disclosure.

Referring to FIG. 2, FIG. 2 is a timing diagram of the PMIC boot timing circuit of the present disclosure. The three voltages generated by the first buck module 11, the second buck module 12 and the third buck module 13 are set as the same setting, using a Pin of the PMIC 1 for timing judgment, the first buck module 11 generates a first voltage DVDD after being turned on, the direct current source 14 charges the first capacitor 2 to a first voltage threshold, the second buck module 12 starts to generate a second voltage Vcore1. After the second voltage Vcore1 is generated, the triode 4 is controlled to be turned on. The direct current source 14 charges the first capacitor 2 and the second voltage 3 to a second voltage threshold, and the third buck module 13 starts to generate the third voltage Vcore2. The charge to the first voltage threshold is controlled by the first capacitor 2 and the charge to the second voltage threshold is controlled by the parallel setting of the first capacitor 2 and the second capacitor 3 after the triode 4 is turned on. In this way, different timing generation and normal boot timing can be realized. The Vdly shown in FIG. 2 of the present disclosure is a change in capacitance charging voltage.

Figure 3:
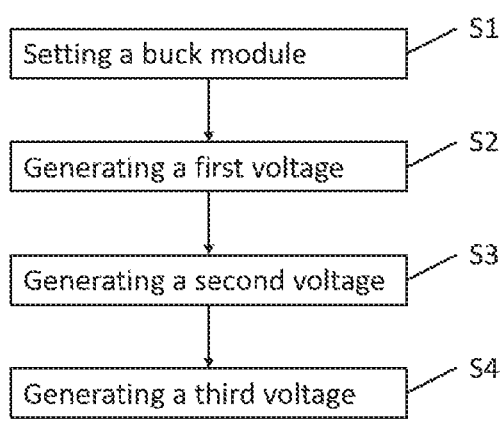
FIG. 3 is a flowchart of the PMIC boot timing determination method of the present disclosure.

Referring to FIG. 3, FIG. 3 is a flowchart of the PMIC boot timing determination method of the present disclosure. The PMIC boot timing determination method includes the following steps.

S1. Setting a buck module, wherein the first buck module 11, the second buck module 12 and the third buck module 13 inside the PMIC 1 adopt the same setting.

The first buck module 11 generates the first voltage, the second buck module 12 generates the second voltage, and the third buck module 13 generates the third voltage. The order of generation can be freely set according to different needs. One of the PIN of the PMIC 1 is used as a timing judgment. The first voltage, the second voltage, and the third voltage are used to drive different sequential circuits.

S2. Generating a first voltage, wherein the first buck module generates the first voltage, and the direct current source charges the first capacitor, when the power is turned on.

The first buck module 11 generates a first voltage DVDD. After the first voltage DVDD is generated, the direct current source 14 charges the first capacitor 2.

S3. Generating a second voltage, wherein the second buck module generates the second voltage, and the second voltage controls the triode to be turned on to dispose the first capacitor and the second capacitor in parallel and to increase the capacitance value, when the direct current source charges the first capacitor to a first voltage threshold.

The direct current source 4 charges the first capacitor 2, when the second buck module 12 detects that the voltage of the first capacitor 2 reaches the first voltage threshold, the second buck module 12 starts to generate the second voltage Vcore1. After the second voltage Vcore1 is generated, the triode 4 is controlled to be turned on, so that the first capacitor 2 and the second capacitor 3 are connected in parallel and the capacitance value is increased.

S4. Generating a third voltage, wherein the direct current source charges the first capacitor and the second capacitor to a second voltage threshold, and the third buck module generates the third voltage.

After the first capacitor 2 and the second capacitor 3 are connected in parallel, the charging voltage can reach the second voltage threshold. At this time, the direct current source 4 charges the first capacitor 2 and the second capacitor 3. When the third buck module 13 detects that the voltages of the first capacitor 2 and the second capacitor 3 reach the second voltage threshold, the third buck module 13 starts to generate the third voltage Vcore2.

In the present disclosure, the grounded end of the first capacitor 2 may also adopt a method of grounding through a resistor so that three voltages are simultaneously established. It is also possible to change the time that occurs between the second voltage and the third voltage by adjusting the changes of the first voltage and the second voltage control capacitor.

Compared with the related art, in the PMIC boot timing circuit and the PMIC boot timing determination method provided in the present disclosure, the first buck module, the second buck module and the third buck module for generating three voltages in the PMIC adopt the same setting. Different voltages and generation times are generated by triode conduction controlling the first capacitance and the second capacitance in parallel state. The different voltages and the generated times are also generated by adjusting the voltage threshold reached by the direct current source charging the first capacitor and/or the second capacitor, so as to realize the generation of different timings and normal boot timings required by the timing control circuit to ensure that the generation of each voltage and the timing can meet the requirements of the timing control circuit, and enable the entire panel drive to operate normally, reducing non-volatile memory device modules in the PMIC.

The foregoing descriptions are merely embodiments of the present disclosure, and do not limit the scope of the present disclosure. Any equivalent structures or equivalent changes made using the contents of the specification and drawings of the present disclosure or directly or indirectly applied to other related technical fields shall be similarly included in the scope of the patent protection of the present disclosure.

What is claimed is:

1. A PMIC boot timing circuit, comprising a PMIC, a first capacitor, a second capacitor, and a triode, wherein the PMIC comprises a first buck module, a second buck module, a third buck module and a direct current source; one end of the first capacitor is connected to the direct current source, and the other end of the first capacitor is grounded; one end of the second capacitor is connected to one end of the direct current source, and the other end of the second capacitor is connected to a drain of the triode; a source of the triode is grounded, and a gate of the triode is connected to the PMIC.

2. The PMIC boot timing circuit according to claim 1, wherein the grounded end of the first capacitor is grounded through a resistor.

3. The PMIC boot timing circuit according to claim 1, wherein the first buck module generates a first voltage; the direct current source charges the first capacitor to a first voltage threshold, and the second buck module generates a second voltage; the second voltage controls the triode to be turned on, the direct current source charges the first capacitor and the second capacitor to a second voltage threshold, and the third buck module generates a third voltage.

4. The PMIC boot timing circuit according to claim 3, wherein the grounded end of the first capacitor is grounded through a resistor.

5. The PMIC boot timing circuit according to claim 1, wherein the triode is configured to control the first capacitor and the second capacitor to be connected in parallel.

6. The PMIC boot timing circuit according to claim 5, wherein the first buck module generates a first voltage; the direct current source charges the first capacitor to a first voltage threshold, and the second buck module generates a second voltage; the second voltage controls the triode to be turned on, the direct current source charges the first capacitor and the second capacitor to a second voltage threshold, and the third buck module generates a third voltage.

7. The PMIC boot timing circuit according to claim 6, wherein the grounded end of the first capacitor is grounded through a resistor.

8. The PMIC boot timing circuit according to claim 1, wherein the triode is a field effect triode.

9. The PMIC boot timing circuit according to claim 8, wherein the first buck module generates a first voltage; the direct current source charges the first capacitor to a first voltage threshold, and the second buck module generates a second voltage; the second voltage controls the triode to be turned on, the direct current source charges the first capacitor and the second capacitor to a second voltage threshold, and the third buck module generates a third voltage.

10. The PMIC boot timing circuit according to claim 9, wherein the grounded end of the first capacitor is grounded through a resistor.

11. A PMIC boot timing determination method based on a PMIC boot timing circuit, wherein the PMIC boot timing circuit comprises a PMIC, a first capacitor, a second capacitor, and a triode; the PMIC comprises a first buck module, a second buck module, a third buck module and a direct current source; one end of the first capacitor is connected to the direct current source, and the other end of the first capacitor is grounded; one end of the second capacitor is connected to one end of the direct current source, and the other end of the second capacitor is connected to a drain of the triode; a source of the triode is grounded, and a gate of the triode is connected to the PMIC; the method comprises the following steps:

step 1, setting a buck module, wherein the first buck module, the second buck module and the third buck module inside the PMIC adopt a same setting;

step 2, generating a first voltage, wherein the first buck module generates the first voltage, and the direct current source charges the first capacitor when the power is turned on;

step 3, generating a second voltage, wherein the second buck module generates the second voltage, and the second voltage controls the triode to be turned on to dispose the first capacitor and the second capacitor in parallel, when the direct current source charges the first capacitor to a first voltage threshold;

step 4, generating a third voltage, wherein the direct current source charges the first capacitor and the second capacitor to a second voltage threshold, and the third buck module generates the third voltage.

12. The PMIC boot timing determination method based on a PMIC boot timing circuit according to claim 11, wherein the triode is a field effect triode.

13. The PMIC boot timing determination method based on a PMIC boot timing circuit according to claim 11, wherein the grounded end of the first capacitor is grounded through a resistor.

* * * * *